(12) United States Patent
Lelegard et al.

(10) Patent No.: US 7,882,350 B2
(45) Date of Patent: Feb. 1, 2011

(54) ENCRYPTION AND DECRYPTION METHOD FOR CONDITIONAL ACCESS CONTENT

(75) Inventors: Thierry Lelegard, Paris (FR); Pascal Junod, Vufflens-la-Ville (CH)

(73) Assignee: Nagra France SAS, Paris (FR)

( * ) Notice: Subject to any disclaimer, the term of this patent is extended or adjusted under 35 U.S.C. 154(b) by 1060 days.

(21) Appl. No.: 11/636,474

(22) Filed: Dec. 11, 2006

(65) Prior Publication Data
US 2007/0180235 A1 Aug. 2, 2007

(30) Foreign Application Priority Data
Dec. 15, 2005 (EP) .................... 05292701

(51) Int. Cl.
H04L 29/06 (2006.01)
H04K 1/04 (2006.01)
H04K 1/00 (2006.01)

(52) U.S. Cl. .................... 713/160; 380/37; 380/274
(58) Field of Classification Search .......... 713/160; 380/274, 37
See application file for complete search history.

(56) References Cited

U.S. PATENT DOCUMENTS

| | | | | |
|---|---|---|---|---|
| 6,826,684 | B1 * | 11/2004 | Fink et al. | 713/160 |
| 6,965,995 | B1 * | 11/2005 | Sato | 713/160 |
| 6,978,384 | B1 * | 12/2005 | Milliken | 726/26 |
| 7,124,434 | B2 * | 10/2006 | Higurashi | 726/5 |
| 7,406,595 | B1 * | 7/2008 | Boyle et al. | 713/160 |
| 7,519,811 | B1 * | 4/2009 | Hara | 713/151 |
| 2003/0051026 | A1 * | 3/2003 | Carter et al. | 709/224 |
| 2004/0111610 | A1 * | 6/2004 | Slick et al. | 713/160 |
| 2006/0056625 | A1 * | 3/2006 | Nakabayashi et al. | 380/46 |
| 2006/0193472 | A1 * | 8/2006 | Yuen | 380/274 |

FOREIGN PATENT DOCUMENTS

EP 1143722 A 10/2001

OTHER PUBLICATIONS

"Digital Video Broadcasting (DVB); Support for use of scrambling and Conditional Access (CA) within digital broadcast systems" European Telecommunications Standards Institute, Oct. 1996.

* cited by examiner

Primary Examiner—William R Korzuch
Assistant Examiner—Trang Doan
(74) Attorney, Agent, or Firm—Harness, Dickey & Pierce, P.L.C.

(57) ABSTRACT

Example embodiments relate to an encryption and decryption method for a conditional access content, including (a) extracting a marker (Mc) from a data packet (DP); (b) creating a first marking block including the marker (Mc) and a second padding value (PAD2); (c) encrypting the first marking block with a second encryption key (K2); (d) encrypting a second encrypted marking value (MK2) of the first encrypted marking block; (e) creating a mixed marking block including the second encrypted marking value (MK2) a the first encrypted padding element (PADK1); (f) decrypting the mixed marking block a device of the first encryption key (K1), in order to obtain a decrypted mixed marking block; (g) extracting a predetermined part of the decrypted mixed marking block; (h) comparing the extracted part with a reference value (Mc; PDV2); and (i) if the comparison leads to an identity, determining a new set of encryption parameters different to the first set of encryption parameters and repeating steps b) to h) in which the second set of encryption parameters is replaced by the new second set of encryption parameters.

18 Claims, 4 Drawing Sheets

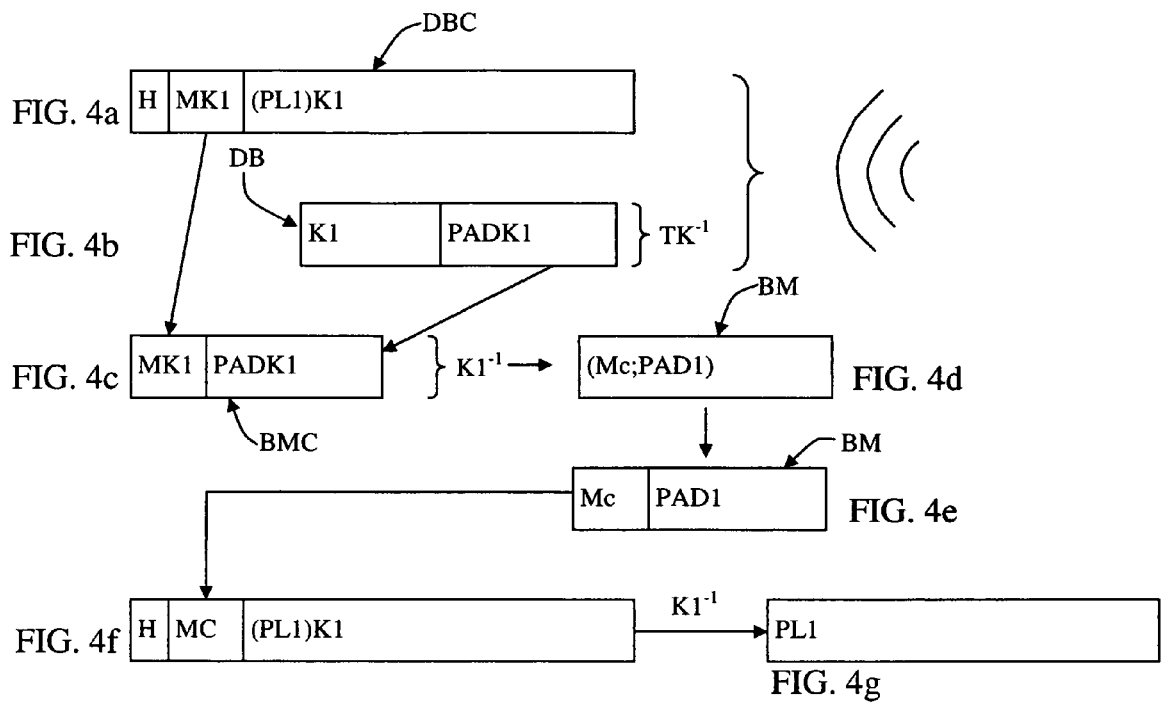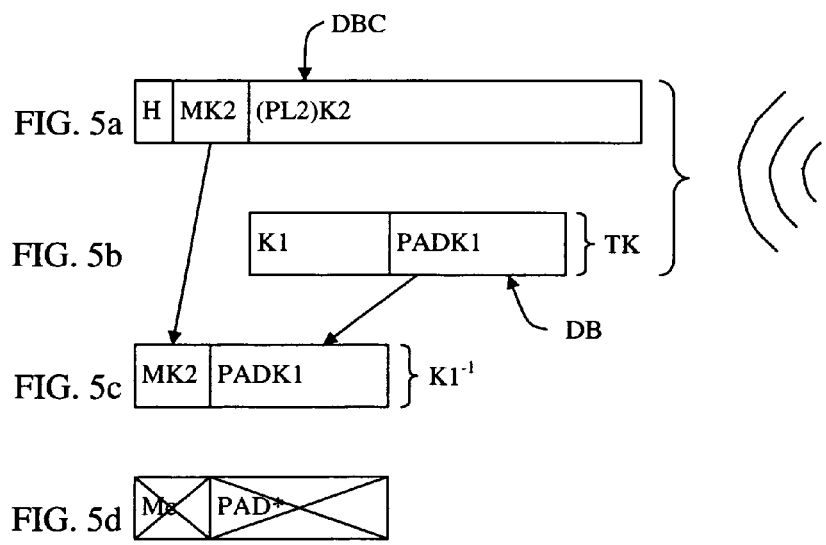

ENCRYPTION AND DECRYPTION METHOD FOR CONDITIONAL ACCESS CONTENT

PRIORITY STATEMENT

This application claims benefit of priority under 35 U.S.C. §119 from European Patent Application No. 05292701.9 filed on Dec. 15, 2005, in the European Patent Office, the disclosure of which is incorporated herein by reference in its entirety.

TECHNICAL FIELD

This invention relates to an encryption and decryption method for conditional access content in which this content is sent in the form of data packets.

This method is applied in particular to Pay-TV, but also to other configurations in which data is sent in an encrypted form. This data could in particular concern financial transactions, software, games or a musical content for example or information such as stock exchange information, weather forecasts or the like.

PRIOR ART

In a certain number of applications, in particular in the field of the Pay-TV, data that forms a content is sent in the form of data packets. These packets can in particular have a pre-defined fixed length. These packets are generally broadcast in encrypted form intended for a set of receivers such as decoders.

In parallel to the data packets, decryption information is also broadcast. In particular, this information contains decryption keys or data that allows the determination of the necessary keys. In order to guarantee a certain level of security in the conditional access data systems, it is imperative that the keys are changed after a certain usage or validity period. In practice, in the particular case of Pay-TV, a key could be used to access a television content for a few seconds, or even a few minutes. One of the constraints related to the change of key is the need to associate the correct decryption key with each data packet, otherwise this data is not accessible. However, it is practically impossible to synchronise the data with the decryption information, in particular due to the internal working of the systems.

For this reason, it is necessary to dispose of a mechanism that allows each data packet to be associated with the corresponding decryption key, without having to synchronise these two elements.

According to a known embodiment, the data packets generally contain a marker with a known value that allows the receiver/decoder to locate the start of a packet and to process this packet accordingly.

According to the standards used for the formatting of these packets, the length of a packet is fixed and it is not possible to add supplementary data to that already existing. In particular, this means that when the encryption key of a packet is modified, it is impossible to indicate this key change in the packet, for example by means of key change information. It should be noted that the change of the keys is not synchronized with the packets, in such a way that one key can be used to encrypt and decrypt several packets.

In practice, on reception of a packet, the latter is decrypted with the current key.

It is then verified if the result of the decryption is usable, that is to say if it contains the marker. If this is not the case, the same packet is decrypted with the following key. If the result of this decryption is usable and thus contains the marker, the new key is used for decryption. If the result of this decryption does not contain the marker, an error message is generated.

This embodiment presents an important drawback. In fact, it happens that the decryption of a packet with the current key gives a result containing the marker, even though this packet has been encrypted with a key other than the current key. This result given randomly is produced according to a significant frequency and prevents a user from accessing the contents even if he has the rights.

This invention proposes to avoid this drawback by carrying out a method in which the decryption with one key, of a packet encrypted by a different key never contains the marker. Therefore, it is impossible to confuse two encryption keys and access to the content is thus always assured.

DISCLOSURE OF THE INVENTION

The object of the invention is achieved by an encryption and decryption method for conditional access content, in which said content is broadcast in the form of data packets, the previous packets being encrypted by a first key associated to a first padding value and to a first encrypted padding element and the following packets being encrypted by a second key associated to a second padding value and to a second encrypted padding element, in which at least said first key and said first padding value form a first set of encryption parameters and in which at least said second key and said second padding value form a second set of encryption parameters, this method comprising the following steps:

a) extraction of a marker from a data packet;
b) creation of a first marking block including on one hand said marker and on the other hand the second padding value;
c) encryption of said first marking block with the second encryption key;
d) extraction of a second encrypted marking value of said first encrypted marking block;
e) creation of a mixed marking block including on one hand said second encrypted marking value and on the other hand said first encrypted padding element;
f) decryption of said mixed marking block by means of the first encryption key, in order to obtain a decrypted mixed marking block;
g) extraction of a predetermined part of the decrypted mixed marking block;
h) comparison of this extracted part with a reference value;
i) if the comparison leads to an identity, determination of a new set of encryption parameters different from the first set of encryption parameters and repetition of the steps b) to h) in which said second set of encryption parameters is replaced by said new second set of encryption parameters.

In a Pay-TV system using the method of the invention, the data packets can be broadcast to a group of receivers, sent in point-to-point form or can be stored on a physical support such as a hard disk for example. The decryption data can also be broadcast, sent point-to-point or stored. Generally, the decryption device inside the receiver or the decoder disposes simultaneously of two pieces of decryption information. When these pieces of information are stored in a memory of the decoder, they are transmitted to the decryption device in such a way that they only dispose of the two pieces of information at the same time, the others remaining stored for subsequent use. If these pieces of information are the decryption keys, it disposes in general of the present key and the following key, that is to say of the key that has served to encrypt the packet during visualisation and the key that has served to encrypt the next packet using a key different from the present key.

Although the data packet, due to its structure and the constraints related to the used standards does not allow the inclusion of key change information, the method of the invention determines for which packet the following key must be used.

In fact, in the invention, while one data packet is accessed, the following packet is decrypted with the current key. In this decrypted packet, it is determined if it contains a marker. If this is not the case, the following key is used to decrypt the data packet. If this following key has been used to encrypt this packet, then this key is used, said key becoming the new current key. Another following key is then loaded.

If the marker is found after the decryption of the packet with the current key, it can be supposed that the current key is that which has been used to encrypt the packet in question. However, in order to avoid this marker from being present randomly even though the following key has been used to encrypt the packet in question, at the moment of encryption, a test is carried out. The aim of this test is to ensure that it is impossible to find the marker after decryption by a certain key of a packet that has been encrypted by another "temporarily adjacent" key, that is to say following or previous.

This cannot be guaranteed by the methods of the prior art. In fact, as previously indicated, a data packet contains in particular a marker and a useful part, the marker being fixed and the useful part being variable. As this useful part is variable, it is impossible to guarantee that if the packet is encrypted with a key, then this packet is decrypted with another key, the packet obtained does not contain the marker.

In this invention, thanks to the test, it is possible to be sure that if the marker is found in the decrypted packet, then the decryption has been carried out with the correct key.

BRIEF DESCRIPTION OF THE DRAWINGS

This invention and its advantages will be better understood with reference to the enclosed drawings and to the detailed description of a particular embodiment, in which:

FIGS. 4a to 4g represent the decryption of a data block by means of the correct key; and FIGS. 5a to 5d illustrate the decryption of a block by means of a false key.

BEST MODE FOR CARRYING OUT THE INVENTION

Figure 1:
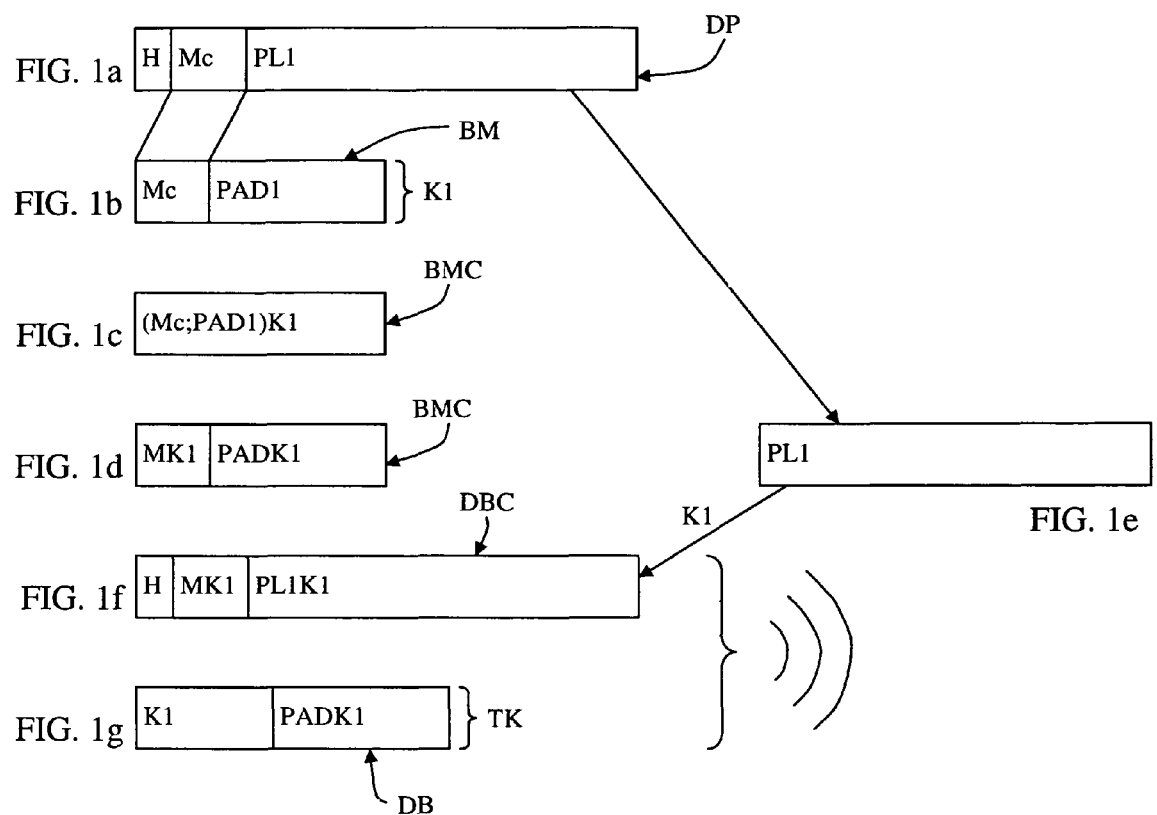
FIGS. 1a to 1g schematically show the encryption of a data packet according to the method of the invention.

With reference to FIGS. 1a to 1g, the content broadcast is transmitted in the form of data packets DP. Each data packet is formed of a header H in clear, of a marker Mc and of a useful part PL. The header H contains service information as well as a packet start indicator. According to a particular embodiment, it is formed of 4 bytes and is always in clear. The marker Mc is constant in all the packets. In practice, it is generally formed of three bytes wherein the first two have the value 0 and the third has the value 1. In the drawings, the useful part PL has the reference 1 for the first packet. It is formed with the conditional access data itself, that is to say audio or video data for example in the case of the broadcasting of Pay-TV content or music. The size of the complete data packet DP is fixed and should not be modified. In practice, it can for example be 188 bytes.

By applying the method of the invention, in a first instance, the marker Mc is extracted from first data packet DP. A block is then formed, called first marking block BM. This marking block includes on one hand the marker Mc and on the other hand a first padding value PAD1. This padding value can be chosen randomly, from a predetermined list or can be constant. The importance of this padding value is described in detail below.

In the method of the invention, generally a block encryption algorithm is used. In this type of algorithm, the size of the used blocks is fixed and can be for example 8 or 16 bytes, although other values are possible. This size is called encryption size hereinafter. The size of the first padding value PAD1 is such that the size of the marking block BM is equal to the encryption size.

The marking block BM is then encrypted with the first encryption key K1 in order to obtain an encrypted marking block BMC. This is cut into two parts, one of the parts having the size of the marker Mc and the other part having the remaining size. The part having the size of the marker has the reference MK1 in FIG. 1d and is called encrypted marking value. The other part has the reference PADK1 and is called encrypted padding element. The place where the encrypted marking block is cut depends on the size of the marker and its location. Therefore, if the marker has a size of three bytes and is placed at the start of the marking block, the encrypted marking value will also have a size of three bytes and will be taken at the start of the encrypted marking block. It is however clear that usually, the encrypted marking value MK1 does not correspond to the marker Mc to which the first encryption key K1 is applied. In a similar way, the encrypted padding element PADK1 does not correspond to the first padding value PAD to which the first encryption key K1 is applied.

The useful part PL1 contained in the first data packet is encrypted by means of the first encryption key K1, using for example also the block encryption method, in order to obtain the encrypted useful part PL1K1.

The marker Mc of the original packet DP is replaced by the encrypted marking value MK1 obtained in the previous step. Likewise, the useful part PL1 is replaced by the encrypted useful part PL1K1. This new block necessarily has the size of the original block. It is called encrypted data block DBC. It is clear that the encrypted data block does not usually correspond to the data packet DP to which the first encryption key K1 would have been applied.

Another block is also formed, called decryption block DB, comprising at least the first key K1 and the encrypted padding element PADK1.

The encrypted data block DBC and the decryption block DB are processed conventionally for their diffusion, that is to say that the decryption block is generally encrypted by a transmission key TK and formatted in order to be sent in a control message ECM to the concerned receivers. The encrypted data block is also transmitted to these receivers.

As previously indicated, the method of the invention guarantees that a key having served for the encryption of data packets may never be confused with another key having served for another data packet.

Figure 2:
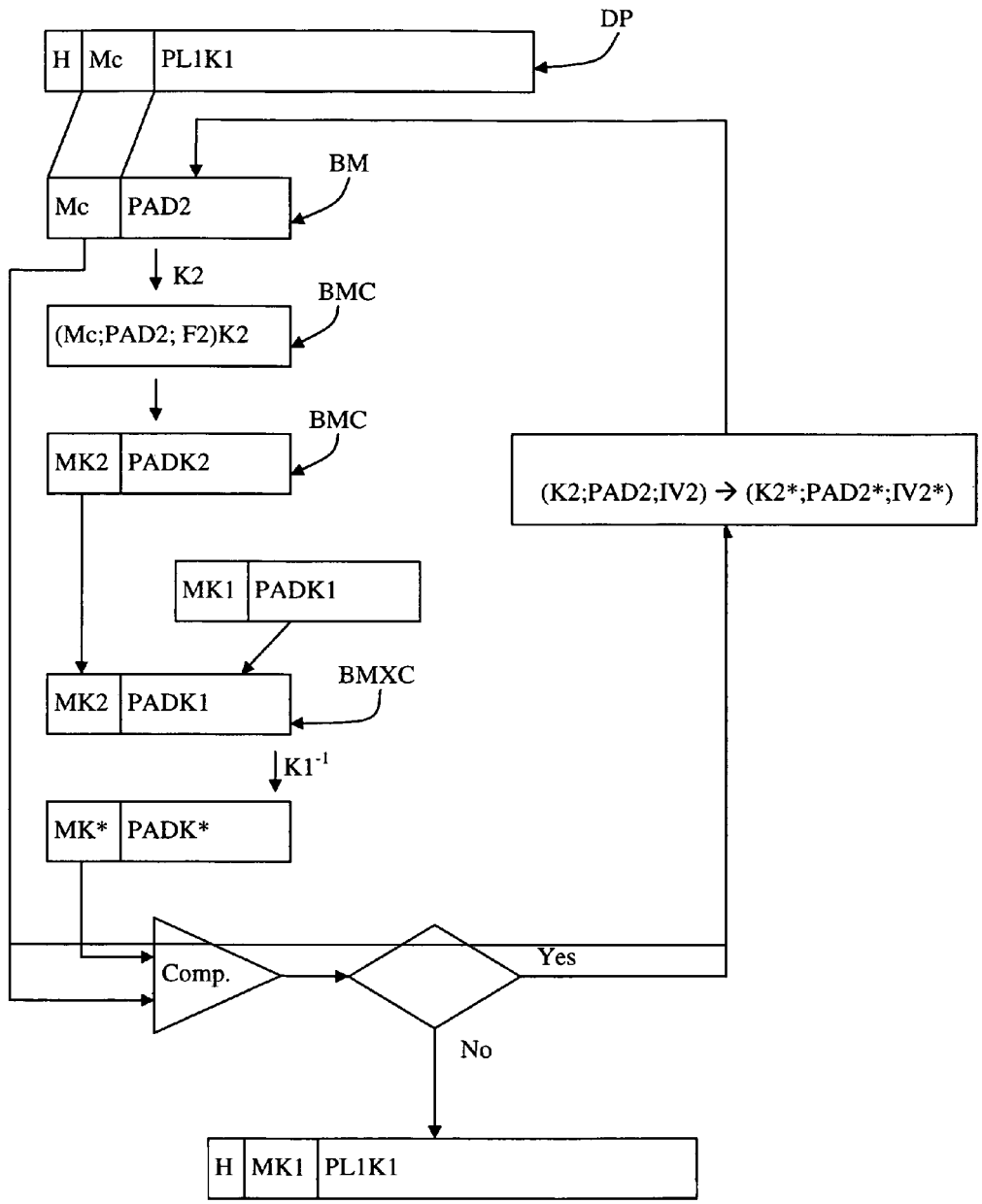
FIG. 2 shows a first embodiment of the verification of the parameters used for the encryption.
Figure 3:
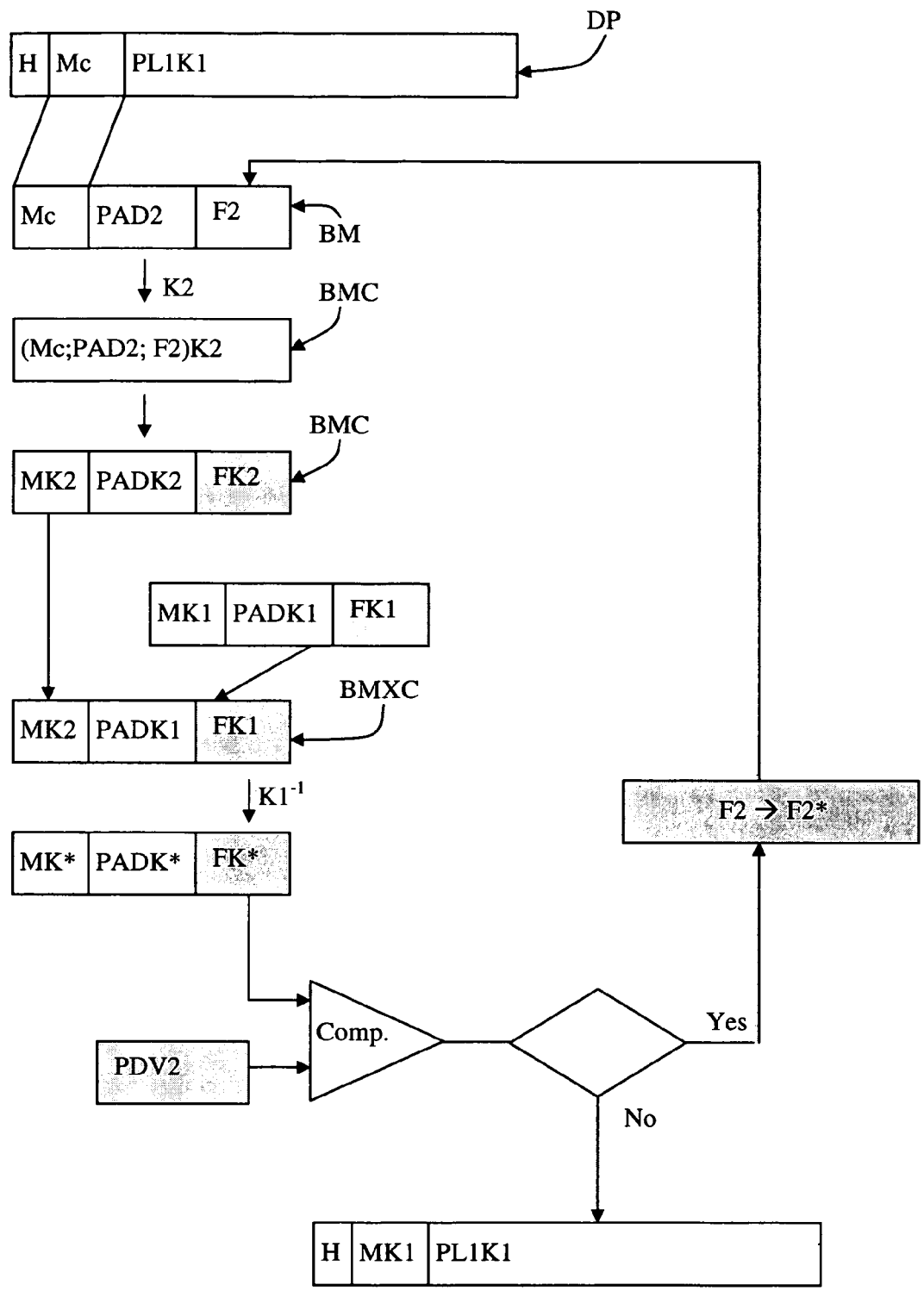
FIG. 3 shows a second embodiment of the verification of parameters used for the encryption.

FIGS. 2 and 3 illustrate two ways to ensure that a confusion of the keys is impossible.

With reference to FIG. 2, it is supposed that the previous data packets have been encrypted by means of a first encryption key K1 and the following packets are encrypted by means of the key K2.

As indicated with reference to FIGS. 1a to 1g and in particular to FIG. 1b, at the time of the preparation of the data for its broadcasting, a padding value PAD1 is chosen to form a marking block BM comprising the marker Mc and the padding value PAD1.

Then the marking block is encrypted with the first encryption key K1. An encrypted marking block BMC is obtained. This is then separated into two blocks, one containing the encrypted marking value MK1 and the other the encrypted padding element PADK1, as shown in FIG. 1d. This encrypted padding element PADK1 is stored so that, at the time of the verification step, it is not recalculated, but simply extracted from the memory.

During this verification step, the marker Mc of a data packet is extracted, then a second padding value PAD2 is added to this marker so as to form a marking block having the size of the data packet. This marking block is encrypted with the second encryption key K2 and forms an encrypted marking block. The latter is cut in such a way as to form a second encrypted marking value MK2 and a second encrypted padding element PADK2. The second encrypted marking value MK2 has the size of the marker and the second encrypted padding element PADK2 represents the balance of the block.

Then a new block is formed, called mixed encrypted marking block BMXC, from the second encrypted marking value MK2 and the first encrypted padding element PADK1. As previously indicated, this first encrypted padding element is already known, since it was formed during a previous step.

This encrypted mixed marking block is decrypted with the key used previously, namely the first encryption key K1. The obtained block is cut so as to form a first part MK* having the length of the marker and a second part PADK* representing the balance of the block. This first part is compared with the marker Mc. If the comparison indicates that these values are different, the method continues as is explained with reference to FIGS. 1a to 1g.

On the contrary, if the comparison indicates that the values MK*; Mc are identical, this can occur randomly and can pose problems at the time of the use of the system, it is necessary to change at least one parameter used for the encryption.

During the use of a block encryption algorithm in a method such as that described above, the used parameters are the second padding value PAD2, the second encryption key K2 as well as possibly an initialisation vector. This initialisation vector is well known in itself and is not described in detail below. Its function is in particular explained in "Applied Cryptography" by Bruce Schneier, $2^{nd}$ edition, §9.3.

When the modified parameter is the padding value, this second padding value PAD2 will be replaced by a new second padding value called PAD2*. If the padding values are determined randomly, it does not pose any problems. If they are chosen from a list, it is sufficient to take another element from the list. If this padding value is fixed, it is necessary for these particular cases to take a padding value different from this fixed value. For this, it is thus necessary to provide the mechanisms that allow the changing of the padding value, even if these values are generally fixed.

When a new second padding value has been determined, it is tested again until a configuration is reached in which the decrypted marking value MK* is different to the marker Mc.

According to one alternative, it is also possible to keep the same padding value and change the key. In fact, it is necessary to change at least one of the values of the above mentioned parameters. It is also possible to change all the values, for example by randomly extracting a new set of used parameters, namely a second padding value, a second key and an initialisation vector.

According to one alternative, shown in FIG. 3, the marker Mc is not tested, but rather another reference data is tested. Instead of using the second padding value PAD2 such as that defined in this FIG. 2, a second fixed value F2 is also used so that the marker Mc, the padding value PAD2 and the fixed value F2 have a length equal to the encryption size.

The verification method is carried out as indicated in the previous embodiment until the obtainment of the mixed marking block decrypted by the first encryption key K1. This decrypted mixed marking block is cut into three parts, namely a first part MK* of the size of the marker, an intermediate part PADK* and a third part FK* of the size of the fixed value F2. By knowing the first padding value PAD1, the first fixed value F1 and the first encryption key K1, it is possible to determine the value which must be obtained for the third part FK* of the decrypted mixed marking block, this value being called predictable reference value PDV2. In this embodiment, if the third part FK* is equal to the predictable reference value PDV2, the second fixed value F2 or the key or an initialization vector is changed, until the comparison indicates a difference in values.

This embodiment indicates that it is not necessary to carry out the comparison on an identical value for all the data packets. In fact, it is sufficient to apply this method to known values in clear the processing of which gives a predictable result.

The FIGS. 4a to 4g describe the decryption of a data packet DP by means of the key K1 that has served to encipher this packet.

As indicated with reference to FIGS. 1f and 1g, the receiver/decoder receives on one hand the encrypted data block DBC and on the other hand the decryption block DB, the latter being encrypted by the transmission key TK.

In a first instance, the decoder uses the transmission key TK to extract the decryption block. From the encrypted marking value MK1 and the encrypted padding element PADK1, the encrypted marking block BMC is reconstituted. Thanks to the knowledge of the first key K1, originating from the decryption block, it is possible to decrypt the encrypted marking block and to obtain the marking block.

This marking block is then cut in order to obtain a block having the length of the marker Mc. This block is tested to verify if it is equal to the marker Mc or not.

Based on the hypothesis that the first key K1 for encryption is also that used for decryption, the block obtained previously would also contain the marker Mc. This characteristic actually allows to ensure that the decryption key is also valid for the data packet processed at present.

Thanks to this marker Mc, the original packet can be reconstituted by replacing the encrypted marking value MK1 in the encrypted data block with the marker Mc. In this way the original data packet DP whose useful part PL1K1 is encrypted is obtained. This is then decrypted by means of the first key K1 in order to obtain the useful part PL1 which is then processed conventionally to access the contents required.

The rest of the description concerns the case wherein the encryption key used is a second encryption key K2 and wherein the first encryption key K1 is used to try to access to data. This case is considered below with reference to FIGS. 5a to 5d.

As previously indicated, the decoder receives an encrypted data block DBC and a decryption block DB, this decryption block itself being encrypted by the transmission key TK. This block is first decrypted thanks to the known transmission key of the decoder. The decoder can then form, as in FIG. 4b, an encrypted marking block comprising the encrypted marking value MK2 and the encrypted padding element PADK1.

This decoder then deciphers this block with its present key, namely the first encryption key K1. The result is cut to the length of the marker Mc, and then compared to this marker. As the key K2 used for encryption is different from the first key K1 used for decryption, the cut part MK2 of the block will be different from the marker Mc.

Moreover, as indicated with reference to FIG. 2, the padding value PAD1 is chosen and verified in such a way that it is impossible for the cut part of the block to be equal to the marker.

In this way, the changing of the key will inevitably be detected by the decoder. As the use of the first key. K1 does not give the expected result, namely the marker Mc, the following key is used, namely the second encryption key K2. In this way, one finds itself in the same case as disclosed in FIGS. 4a to 4g, by replacing the first encryption key K1 by the second encryption key K2, which allows the marker Mc to be found and thus allows access to the useful part PL. It should be noted that, generally, if the use of this new key does not give the expected result either, that is to say the marker, an error message will be generated.

In the above description, it is indicated that the actual decryption device contains two keys, namely the current key and the following key. According to one alternative, it could also contain more, for example 5, registered in a shift register. In this case, when the first key is no longer usable, it is eliminated and the second key takes its place. The 5$^{th}$ key takes the 4$^{th}$ place and a new key is introduced in the 5$^{th}$ position.

The keys used in the present invention can be of symmetrical or asymmetrical type. In the case of a symmetrical key, the same key is used to encrypt as well as to decrypt. In the case of an asymmetrical key, the key used to encrypt data is different from the key allowing them to be decrypted. Therefore, in the above description, when it is indicated that the decryption is carried out with the first key K1 for example, it is necessary to understand that in the case of the use of asymmetric keys, this decryption is carried out with the key of the pair of keys which has not been used for the encryption.

Although it is not explicitly represented in the drawings, when an initialisation vector is used in the field of block encryption, this vector is also transmitted to the decoder in the decryption block so that this vector is also available during decryption.

The invention claimed is:

1. An encryption and decryption method for conditional access content, in which said conditional access content is broadcast in a form of data packets, previous packets being encrypted by a first key associated to a first padding value and to a first encrypted padding element and following packets being encrypted by a second key associated to a second padding value and to a second encrypted padding element, in which at least said first key and said first padding value form a first set of encryption parameters and in which at least said second key and said second padding value form a second set of encryption parameters, the method comprising:

extracting a marker from a data packet;
creating a first marking block including on one hand said marker and on the other hand the second padding value;
encrypting said first marking block with the second key;
cutting said encrypted first marking block in at least two parts, one of said parts having a size of the marker and forming a second encrypted marking value;
creating a mixed marking block including on one hand said second encrypted marking value and on the other hand said first encrypted padding element;
decrypting said mixed marking block via the first key, in order to obtain a decrypted mixed marking block;
extracting a part of the decrypted mixed marking block;
comparing the extracted part with a reference value; and
if the comparison leads to an identity, determining a new set of encryption parameters different from the first set of encryption parameters and repeating at least one of the extracting of the marker, creating the first marking block, extracting the first marking block, cutting the encrypted first marking block, creating the mixed marking block, decrypting the mixed marking block, extracting the part of the decrypted mixed marking block, and comparing the extracted part in which said second set of encryption parameters is replaced by a new second set of encryption parameters.

2. The method according to claim 1, wherein the first and second set of encryption parameters include an initialization vector.

3. The method according to claim 1, wherein said new set of encryption parameters is different from said first set of encryption parameters by at least one of said parameters.

4. The method according to claim 1, wherein during step h), the comparison of the extracted part is made in relation to the marker.

5. The method according to claim 1, wherein during the step h), the comparison of the extracted part is made in relation to a known value equal to an extracted part of the second padding value.

6. The method according to claim 1, wherein the size of the marking block formed from the marker and said first or second padding value is equal to a size compatible with a block encryption algorithm.

7. The method according to claim 1, wherein said part of the decrypted mixed marking block extracted from the block has a size equal to the size of the marker.

8. The method according to claim 1, further comprising:
creating a first marking block including on one hand said marker and on the other hand a first padding value;
encrypting said marking block with the first key;
extracting a first encrypted marking value from said encrypted marking block;
replacing in the data packet of the marker with said part of the encrypted marking block extracted from the block to provide an encrypted marking value, and the result of the replacement to provide an encrypted data block; and
creating a decryption block formed at least on one hand by said encrypted first key and on the other hand by said encrypted padding element, the encrypted padding element being formed by said encrypted marking block from which has been withdrawn the encrypted marking value.

9. The method according to claim 8, wherein said encrypted data block and said decryption block are transmitted to at least one receiver, said decryption block also being encrypted by a transmission key.

10. The decryption method according to claim 9, further comprising:
receiving said encrypted data block and of said decryption block and decryption of the decryption block via the transmission key;
creating the encrypted marking block by extracting the encrypted marking value originating from the encrypted data block and by extracting the encrypted padding element originating from the decryption block;

decrypting the encrypted marking block via a current key;
extracting a predetermined part of the marking block obtained during said decryption of the encrypted marking block;
comparing the predetermined part of the marking block with a reference value;
in case of identity, replacing the encrypted marking value of the encrypted data block with said marker;
extracting, decrypting, and using the useful part;
in the case that there is no identity at the time of said comparison, decrypting the encrypted marking block via a following key;
extracting a predetermined part of the marking block obtained during said decryption of the marking block with a new key;
comparing the part of the marking block with said reference value;
in case of identity, replacing the encrypted marking value of the encrypted data block by said marker; and
extracting, decrypting, and using the useful part.

11. The method according to claim 10, wherein in the case that there is no identity after decryption with said following key, generating an error message.

12. The method according to claim 10, wherein the comparison of the extracted predetermined part is made in relation to the marker.

13. The method according to claim 10, wherein the comparison of the extracted predetermined part is made in comparison with a known value equal to an extracted part of the first padding value.

14. The method according to claim 11, wherein the size of the extracted block of the encrypted marking block is equal to the size of the marker.

15. The method according to claim 1, wherein two keys are stored, one having the function of a present key and the other having the function of a following key.

16. The method according to claim 1, wherein several keys are stored and associated to an order of use.

17. The method according to claim 1, wherein the encryption and decryption is performed at a head end of the marker.

18. The method according to claim 17, wherein a check is carried out at the head end to determine if the marker would be detected with to consecutive pairs of parameters.

* * * * *